UNITED STATES PATENT OFFICE.

H. L. EDDY, OF GENEVA, ASSIGNOR TO HIMSELF AND A. DUNLAP, OF OVID, NEW YORK.

IMPROVED METHOD OF PRESERVING WOOD.

Specification forming part of Letters Patent No. 53,217, dated March 13, 1866.

*To all whom it may concern:*

Be it known that I, H. L. EDDY, of Geneva, in the county of Ontario and State of New York, have invented or discovered a new and useful Preservative or Antiseptic for Wood, Cordage, and other Articles; and I do hereby declare that the following is a full, clear, and exact description of the nature, effects, and application of my invention or discovery.

It consists in the application of petroleum, or its liquid products, to wood in such a manner as to entirely saturate the timber, lumber, &c., which may be treated with it.

The application may be made by placing the timber, &c., in large vats or tanks prepared for the purpose and partially filled with the petroleum, where it should be allowed to remain until it becomes thoroughly saturated with the oil, when it may be removed and a fresh batch put in, the petroleum in the vat being replenished as it becomes absorbed by the wood; or the application may be made by dipping when the articles to be treated are small, or with a brush, as may be desired. If the latter method be adopted it should be applied to the whole surface, and in many instances several coats may be required in order to effect a perfect and entire saturation or treatment of the articles to be preserved.

I do not propose to mix with the petroleum any paints or mineral colors in my application of this preservative, because that would prevent it from fully penetrating and permeating the articles treated; but the paint or coloring material may be applied after the articles have been treated with the petroleum.

Some of the great advantages resulting from the application of the discovery will appear from the following detailed description.

The causes which induce or promote putrefaction are air, moisture, warmth, cryptogamic plants, and infusory insects. Now, that which will entirely destroy or neutralize all these causes is the most perfect antiseptic agent, and that, probably, is freezing.

Chemicals act in different ways in checking or in preventing putrefaction. For instance, oils, paints, tars, and gums act mechanically to exclude air and water. Sulphurous acids and other such substances may absorb the oxygen of the air or the moisture, either or both, while chemicals containing mineral or vegetable oils may combine with the organic substances and thereby form new materials or compounds, the nature of which may tend less to decomposition or entirely prevent it. Other chemicals—such, for instance, as aromatic oils—may be capable of destroying living vegetation and infusory animals on dead organic matter, or even to prevent life from taking place. Certain other antiseptic chemicals—such as common salt, saltpeter, alcohol, &c.—act in a twofold manner. They may either abstract water from the organic matter and form new compounds, or they may abstract the moisture and the oxygen of the air. Others, again, have a threefold action—*i. e.*, they abstract the water, exclude the air, and destroy animal and vegetable life. I have ascertained that the substance that will do all this work fully and completely, and do it cheaply and that is simply and easily applied, is petroleum—that is, it excludes the air and moisture from organic substances, destroys living vegetables and animals, and instead of containing oxygen, which is a necessary element of decomposition, it contains carbon, which is probably one of the most perfect chemical antiseptics known.

Repeated experiments have shown that if even green wood be immersed in petroleum, which might be called "liquid carbon," it will permeate every minute pore of the wood, and, of course, expel the water and air, and thereby substitute the indestructible material, carbon, for that which promotes decomposition.

When the petroleum is to be applied to wood or other materials it may be heated to cause it to penetrate more readily and perhaps more effectually, and thereby save time, &c. Especially is this desirable when applied to large timbers, and it may be applied with a brush, or with a sponge or other suitable swab.

When large posts or piles, &c., are to be treated, if they are already set or driven, it may be very effectually done by boring a hole diagonally into them a few inches, and just above the ground, and pouring the petroleum in, whence it will permeate every portion of that end of the stick, and if a sufficient quantity is applied it will find its way throughout the whole timber, producing the effect heretofore described.

A very good effect may be produced by using the petroleum cold, but it requires more time, of course, to make the application as perfect and effectual.

The preservative or antiseptic qualities of carbon have long been known, and this knowledge has been applied practically by the charring of posts, &c.; but that is only a superficial application of the principle, as is also the use of paint, coal-tar, &c., whereas by the use of this liquid carbon the work is thorough and complete, the entire body being treated, and that perfectly.

This liquid carbon may also be applied to the preservation of dead human or other bodies by injecting it into the veins or otherwise.

What I claim as my invention, and desire to secure by Letters Patent, is—

The application of petroleum or its liquid products to wood or other fibrous substances as an antiseptic or preservative agent.

H. L. EDDY.

Witnesses:
F. T. BACKENSTOSE,
H. M. EDDY.